United States Patent Office 3,348,004
Patented Oct. 17, 1967

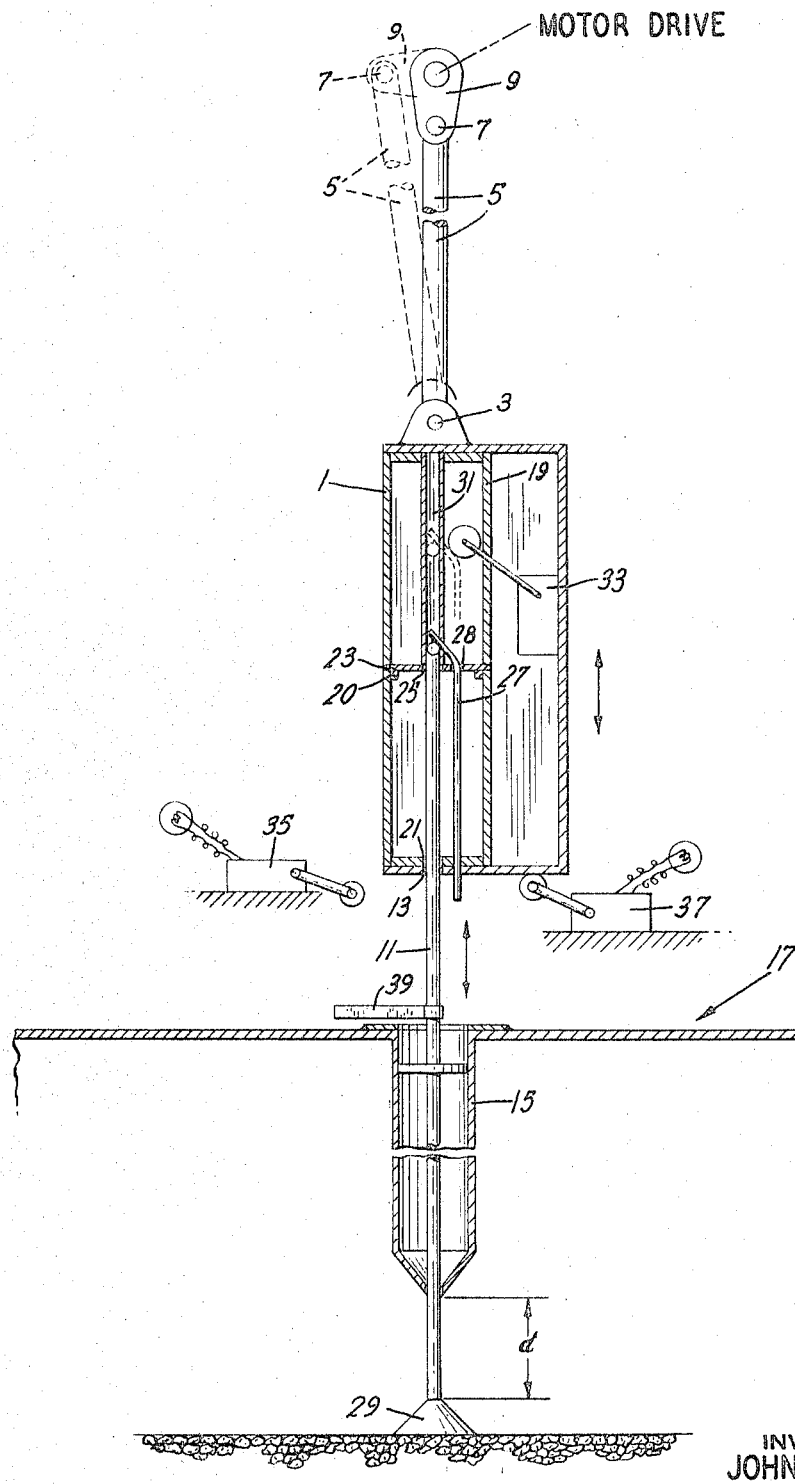

3,348,004
LEVEL INDICATOR FOR DETERMINING HEIGHT OF SOLID MATERIAL IN A STORAGE VESSEL
John H. Carroll, Ashtabula, Ohio, assignor to Union Carbide Corporation, a corporation of New York
Filed Jan. 25, 1966, Ser. No. 522,886
3 Claims. (Cl. 200—61.2)

The present invention is directed to apparatus for determining the level of solid material in a storage vessel. More particularly the present invention is directed to apparatus for determining the level of solid material, such as stone, in storage vessels, in connection with the operation of vertical lime kilns.

In the operation of vertical lime kilns, and other equipment, it is a practical necessity that the level of solid material in associated storage compartments or vessels be known continuously in order to permit efficient charging and kiln operation. With vertical lime kilns in particular it is important that accurate information be continually available as to the varying level of stone in the kiln. The equipment used for this purpose in the past e.g. photo-electric cell arrangements and "paddle" type devices have not been entirely satisfactory for various reasons. Photo cells for example, are generally impractical in lime kiln operations due to the very high temperatures involved and "paddle" type indicators take up a large amount of space and thus cause a highly undesirable loss in kiln capacity.

It is therefore an object of the present invention to provide a level indicator which is relatively small and simple and rugged in construction and which can be used to measure the level of solid materials at high temperatures.

Other objects will be apparent from the following description and claims taken in conjunction with the drawing which shows, somewhat schematically, an elevation view of a level indicator in accordance with the present invention.

With reference to the drawing, the numeral 1 designates a frame suitably formed of steel plate which is pivotally connected at 3 to a rod 5 which is in turn pivotally connected at 7 to driving arm 9. Driving arm 9 is continually rotated by a motor (not shown) at a convenient speed of say about 10 r.p.m. As a result of the rotation of driving arm 9, the frame 1 will be raised and lowered, the total displacement being twice the length of driving arm 9.

As shown in the drawing, a rod 11, hereinafter called the sensing rod, is slidably engaged through opening 13 with the support frame 1 and extends downward and is also slidably engaged with a housing 15 which is in communication with storage bin 17. Sensing rod 11 as also shown in the drawing is engaged to cylinder assembly 19 which is fixedly mounted on frame 1. As can be seen, sensing rod 11 passes slidably through opening 13 in the frame 1 and opening 21 in cylinder 19 and extends up through the plate 23 which is fixedly mounted in cylinder 19 as shown at 20. At a position above the opening 25 in plate 23 sensing rod 11 is bent over and connected, e.g. by welding, to an actuating arm 27 which is also slidably engaged with plate 23 through opening 28.

In the operation of the apparatus of the present invention, rod 9 is continuously rotated at a convenient rate, e.g. 10 r.p.m. as noted before, and as a result of this motion and the previously described arrangement, frame 1 moves vertically up and down and, unless its movement is restricted by contact with material in the storage bin 17, sensing rod 11 and actuating arm 27 move with the frame 1 by virtue of their engagement with plate 23. When, however, the solid material in bin 17 reaches a height such that the lower end 29 of sensing rod 11 makes contact therewith, rod 11, and actuating arm 27 are restrained in their downward movement and rod 11 slides in grooved member 31. As a result, actuating arm 27 connected to rod 11 approaches contact with limit switch 33 and when the level of the solid material in bin 17 reaches a predetermined level, actuating arm 27 contacts limit switch 33 which develops an electrical signal in a conventional manner, and shuts off the feed of material to bin 17, also in a conventional manner. It can thus be seen that sensing rod 11 and actuating arm 27, being integrally connected, act as a transducer in actuating switch 33 as a result of contact with solid material at a predetermined level. As the level of material in the bin eventually becomes lower sensing arm 11 falls of its own weight and switch 33 is deactuated and feeding of material to the bin is resumed.

An advantage of the present invention is that the level which the sensing rod will detect can be adjusted merely by changing the length of driving arm 9. For example, and with reference to the drawing, the maximum displacement "d" is equal to twice the length of driving arm 9.

A particular advantage of the present invention is that the sensing rod 11 cannot be rendered inoperable by being trapped in the solid material since the sensing rod is raised with each revolution of the driving arm and rests on the charge only intermittently until the predetermined level is reached, at which time feed to the bin 17 is discontinued. A further advantage of the present invention is that additional limit switches such as 35 and 37 can be readily employed to provide additional assistance to operating personnel. For example, switch 35, positioned as shown will be actuated by extension 39 whenever the level of material in bin 17 is at or above the desired predetermined level and can thus be used to energize an indicating light. Switch 37, positioned as shown will be actuated once during each revolution by frame 1 and can intermittently energize a second indicating light thus showing from a distance that the level detection apparatus is operating.

From the foregoing description and in view of the simplicity of construction of the described apparatus it can be seen that the present invention represents a contribution of considerable industrial benefit.

What is claimed is:
1. Apparatus for determining the level of solid material which comprises:
 (a) a support means adapted to be reciprocally driven in a vertical direction
 (b) means for reciprocally driving said support means
 (c) transducer means extending below and supported by said support means and slidably engaged therewith and being relatively vertically movable with respect thereto when downward movement of said transducer means is restrained by contact with solid material

(d) switch means mounted on said support means and actuated by said transducer means when said transducer means is in contact with solid material at a predetermined level.

2. An apparatus in accordance with claim 1 wherein at least one stationary switch is arranged adjacent said support means whereby it is intermittently contacted and actuated thereby as a result of vertical reciprocal movement of said support means.

3. An apparatus in accordance with claim 1 wherein at least one stationary switch is arranged adjacent said transducer means whereby it is contacted and actuated thereby when said transducer means is at a predetermined level.

References Cited

UNITED STATES PATENTS

| 1,280,222 | 10/1918 | Hester | 200—84 |
| 1,772,540 | 8/1930 | Fowler | 200—61.42 |
| 2,836,672 | 5/1958 | Craven et al. | 200—52 |
| 3,286,053 | 11/1966 | Capra | 200—61.21 |

BERNARD A. GILHEANY, *Primary Examiner.*

H. E. SPRINGBORN, *Assistant Examiner.*